UNITED STATES PATENT OFFICE.

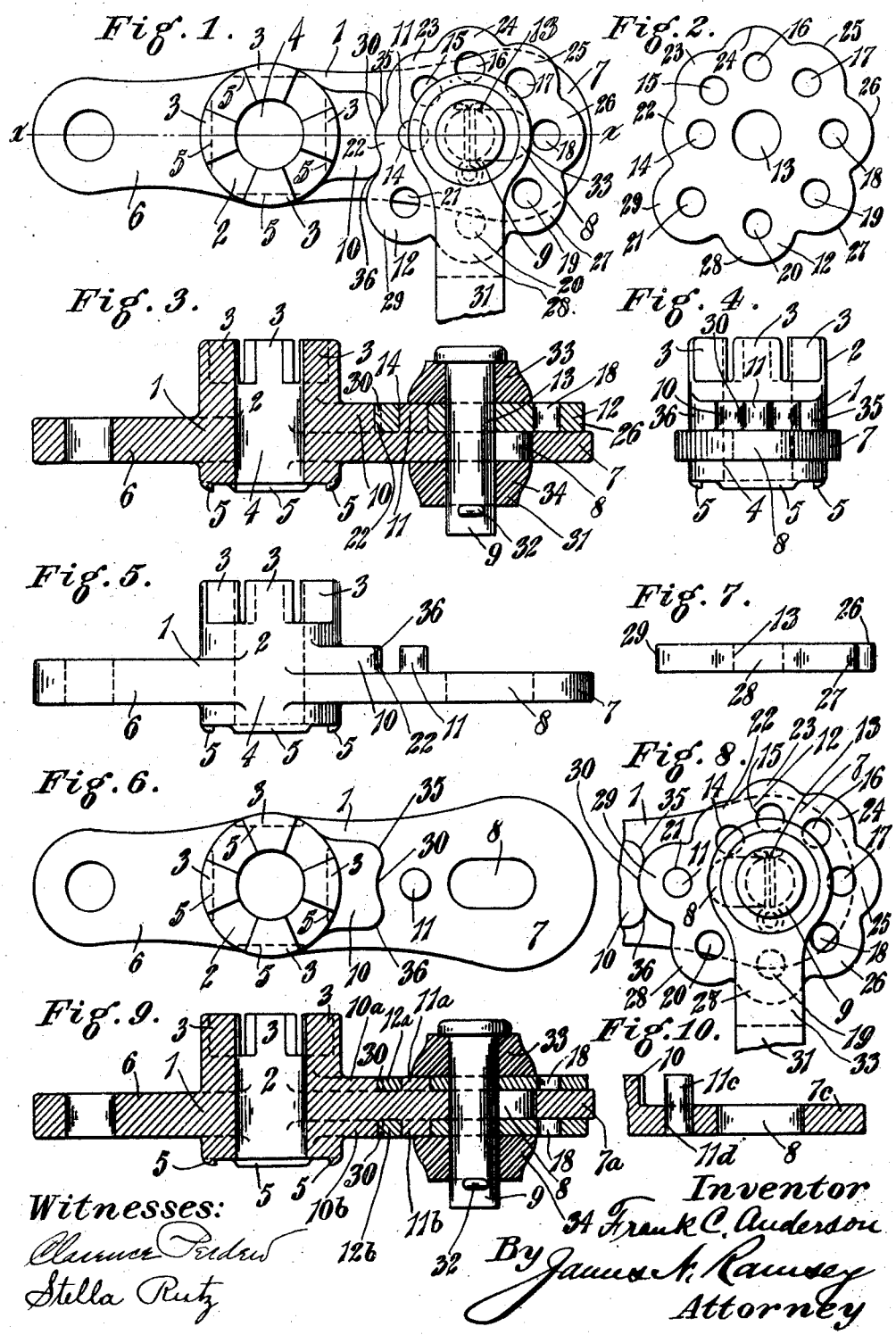

FRANK C. ANDERSON, OF CINCINNATI, OHIO, ASSIGNOR TO AMERICAN VALVE & METER COMPANY, OF CINCINNATI, OHIO, A CORPORATION OF WEST VIRGINIA.

ADJUSTABLE SWITCH-THROWING CRANK.

No. 907,114.      Specification of Letters Patent.      Patented Dec. 22, 1908.

Application filed April 27, 1908. Serial No. 429,463.

*To all whom it may concern:*

Be it known that I, FRANK C. ANDERSON, a citizen of the United States, residing at Cincinnati, in the county of Hamilton and State of Ohio, have invented certain new and useful Improvements in Adjustable Switch-Throwing Cranks, of which the following is a specification.

My invention relates to switch operating mechanism, and its object is to facilitate the adjustment of the throw of the switch stand to compensate for wear in the parts of the switch stand mechanism and for the wear on the rails of the switch.

My invention consists in the combination of a crank having a slot with a pin passing through the slot, and a connecting rod pivotally attached to the crank by means of the pin to operatively connect the crank with the rails of the switch, and a plate rotatable on the pin and having abutments at variable radial distances from the pin, and an abutment on the crank with which the abutments on the plate may severally make contact to secure the pin against movement along the slot.

My invention also consists in the parts and in the details of construction and arrangement of parts as will hereinafter be more fully described and claimed.

In the drawing: Figure 1 is a plan view of a crank and part of the connecting rod with the pin and plate assembled therewith, as I prefer to embody my invention. Fig. 2 is a plan view of the plate. Fig. 3 is a longitudinal section on a line corresponding to the line *x—x* of Fig. 1, the pin and its cotter being shown in side elevation. Fig. 4 is an end view of the crank. Fig. 5 is a side elevation of the crank. Fig. 6 is a plan view of the crank. Fig. 7 is a side elevation of the plate. Fig. 8 is a plan view of part of a crank and connecting rod with the plate and pin assembled therewith, showing the parts adjusted differently than those illustrated in Fig. 1. Fig. 9 is a longitudinal section similar to Fig. 3 showing a modification of my invention. Fig. 10 is a partial longitudinal section of a crank of another modified construction.

As I prefer to illustrate my invention, the crank 1 comprises the hub 2, which is provided with segmental lugs 3, on its upper surface, adapted to fit into corresponding recesses in the segment of a switch stand, an opening 4 through which the shaft of the switch stand may pass, and lugs 5, on the lower surface of the hub, adapted to prevent the turning of a nut which is screwed onto the lower end part of the shaft of the switch stand, these parts being designed to cause the crank 1 to rotate with the segment of the switch stand, and they, as well as the shaft and switch stand being heretofore disclosed, need not be further described. As illustrated, this crank 1 is also provided with an arm 6 of usual construction, the use of this arm 6 being optional, to provide for purposes where an adjustable arrangement would be undesirable. The other arm 7 of the crank 1 has the slot 8 extending radially thereof with semi-circular ends, and the pin 9 of the form usually employed in switch throwing cranks, passes through the slot 8, which slot 8 is of sufficient width relative to the diameter of the pin 9 to confine the pin 9 to movement substantially radially of the crank.

Extending radially from the hub 2 of the crank is the lug 10, and between the lug 10 and the slot 8 is the isolated lug 11. The adjusting plate 12 has a circular opening 13 of sufficient diameter to allow the pin 9 to pass therethrough and form a pivotal connection with the plate 12. Circular openings 14, 15, 16, 17, 18, 19, 20 and 21 are provided in the plate 12, these openings, respectively, being located at preferably constantly increasing radial distances from the opening 13 and being of sufficient diameter to easily fit over the isolated lug 11. The periphery of the plate 12 conforms to arcs concentric with the various openings 14, 15, 16, 17, 18, 19, 20 and 21 so that extensions 22, 23, 24, 25, 26, 27, 28 and 29, respectively, are formed thereon, and the lug 10 is provided with a recess 30 conforming to and adapted to receive any one of said extensions on the periphery of the plate when the isolated lug 11 has entered the opening corresponding to that extension. The isolated lug 11 is so positioned with respect to the lug 10 that when it enters one of the openings 14, 15, 16, 17, 18, 19, 20 or 21 in the plate, the corresponding extension 22, 23, 24, 25, 26, 27, 28 or 29 will make contact with the concave surface within the recess 30 in the lug 10, so that the lug 10 constitutes an abutment on the crank 1, and any one of the above mentioned extensions constitutes an abutment on the plate 12. The contact of these abutments will thus prevent the movement of the pin 9 toward the opening 4 in the crank when this pin 9 passes through the opening 13 in the plate 12 and through the slot 8 in the arm 7 of the crank 1. On the other hand, the isolated lug 11, fitting into the opening in the plate 12 corresponding to the extension which makes contact with the lug 10, will prevent the movement of the pin 9 away from the opening 4 in the crank 1 when the pin thus passes through the opening 13 in the plate 12 and through the opening 8 in the arm 7 of the crank 1, so that the inner concave surface of the opening into which the isolated lug 11 fits, constitutes an abutment on the plate 12, and the convex surface of the isolated lug 11 constitutes an abutment on the crank 1. The radii of the arcs, to which the extensions on the periphery of the plate 12 conform being uniform, any of these extensions will be sure to make contact with the lug 10, while the inner concave surface of the corresponding opening will make contact with the isolated lug 11, so that the pin 9 may be secured against movement radially of the crank by passing it through the opening 13 in the plate 12, and passing the isolated lug 11 through any of the openings above described as being located at various radial distances from said opening 13.

As the switch stands are usually constructed, the crank 1 is operated one-fourth of a revolution to throw the switch, and it will readily be seen that if the pin 9 which forms the pivotal connections with the connecting rod 31, and which connecting rod 31 is attached to the rails of the switch, is moved away from the opening 4 which receives the shaft of the switch stand, and the axial line of which shaft forms the axis of the crank 1, the movement of the pin 9, and consequently the movement of the connecting rod 31 and the rails of the switch, will be increased when the crank still operates through a quarter of a revolution. Owing to wear in the parts of the switch stand not herein shown and described, such as in the teeth of the gear or segment or in the bearings, the crank 1 may cease to be operated the full distance through which the switch stand has been designed to operate it, with the consequence that the movement of the rails of the switch would be decreased. Also the rails of the switch may become worn, due to friction with the wheels pasing over them, so that the rails do not properly perform their function. In either of the above cases it is necessary to compensate for the wear, and the most convenient means of accomplishing this is to increase the radial distance between the shaft of the switch stand, which passes through the opening 4, and the pin 9 which forms the pivotal connection between the crank 1 and the connecting rod 31.

From the above description it will readily be seen that in order to increase this distance and at the same time secure the pin 9 against movement radially of the crank in either direction, it is only necessary to remove the cotter 32 from the pin 9, and remove the pin 9 from the connecting rod 31, the opening 13 in the plate 12 and the slot 8 in the arm 7 of the crank 1, then remove the plate 12 from the arm 7 so that the isolated lug 11 is withdrawn from the opening in which it happens to be inserted, rotate the plate 12 and insert the isolated lug 11 into the next opening of greater distance from the opening 13, thus replacing the plate 12 on the arm 7 of the crank 1. Then replace the connecting rod 31, pin 9 and cotter 32, fixing the pin 9 in a new position at an increased distance from the opening 4. After the parts of the switch stand and the rails have worn still more, this operation may be repeated, rotating the plate and inserting the isolated lug 11 in the next opening located farther from the opening 13 in the plate 12, thus continuing until the last opening located farthest from the opening 13 is used, as illustrated in Fig. 8 of the drawing. The plate 13 may be provided with a sufficient number of openings to thus successively compensate for wear until the switch stand has reached the limit of its usefulness, while the difference in radial distance from the opening 13 to any two adjacent openings in the plate 12 may be such that accurate adjustment may be always secured and the switch always maintained in thoroughly efficient operative condition.

The modification illustrated in Fig. 9 of the drawing provides for a more symmetrical mounting of the pin 9 than is afforded by the construction illustrated in the preceding figures, by making use of two adjusting plates 12$^a$ and 12$^b$, and providing the arm 7$^a$ with lugs 10$^a$ and 10$^b$ and isolated lugs 11$^a$ and 11$^b$ mounted, respectively, on its upper and lower surfaces, the other details being like those illustrated in the preceding figures of the drawing and hereinbefore described.

The connecting rod 31 is bifurcated so that it has members 33 and 34 lying, respectively, over and under the arm 7 and plate 12, and, as it may be desired to use a connecting rod of the same dimensions in connection with the arm 7$^a$ and the two plates 12$^a$ and 12$^b$, the distance between the members 33 and 34 being only sufficient to admit the arm 7 and plate 12 for freely operating therein, it is not desirable to increase the aggregate thickness of the arm and plates. Therefore, in this modified construction the plates 12$^a$ and 12$^b$ are preferably of only half the thickness of the plate 12, while the thickness of the arm 7$^a$ is the same as that of the arm 7, so that the aggregate thickness of the arm 7ᵃ and plates 12ᵃ and 12ᵇ is the same as the combined thickness of the arm 7 and plate 12. In connection with this it will be noted that the aggregate thickness of the arm 7 and plate 12, or of the arm 7ᵃ and the plates 12ᵃ and 12ᵇ is greater than the thickness of the arm 6, which may be used by merely taking the crank off the shaft of the switch stand and rotating it through a half revolution; it may therefore be explained that as the switch stands have been heretofore constructed, the distance between the members 33 and 34 of the bifurcated connecting rod 31 has been greater than the thickness of the crank 6, in the proportion herein illustrated, so that the arm 7 with its plate 12, or the arm 7ᵃ with its plates 12ᵃ and 12ᵇ will be received between the members of the bifurcated connecting rods now in use upon switches.

In the modification illustrated in Fig. 10, the isolated lug 11 has an equivalent in the steel pin 11ᶜ driven into an opening 34 in the arm 7ᶜ. This construction is somewhat stronger than the constructions illustrated in the preceding figures, in which the lug 11 or the lugs 11ᵃ and 11ᵇ are formed integral with the arm 7 or 7ᵃ, respectively, and composed preferably of malleable iron.

Whether the isolated lug be formed integral with the crank, or whether it be a pin inserted therein, it is desirable to guard against its fracture by side pressure thereon which might be caused, should the diameter of the opening 13 in the plate 12 be less than the width of the slot 8 in the arm 7 (and which slight variation is admissible in the construction of switch operating mechanism) so as to allow the plate to be moved in the direction of the tension or compression on the connecting rod 31, and should the periphery of the plate 12 so bear against the lug 10 as to form a fulcrum, thereby throwing undue pressure on the isolated lug. This is guarded against by causing the periphery of the plate 12 to conform to arcs concentric with the openings which admit the isolated lug 11, as above described, and so shaping the lug 10 at 35 and 36 that the plate 12 may be allowed to rotate slightly on the isolated lug 11 without bringing the adjacent extension of the periphery against the lug 10.

The lug 10, extending radially from the hub 2 of the crank 1, as above described, is provided to form an abutment against which the periphery of the plate 12 may bear to resist the movement of the plate toward the hub 4. The pressure tending to move the plate toward the hub occurs when the arm 7 of the crank 1 is holding the rails of the switch against movement while trains are passing over the switch, and it is undesirable to depend upon the isolated lug 11 for this purpose. This reinforcement is especially desirable when the crank 1 occupies such a position and is performing the function of holding the rails in position for the passage of trains over the switch at high speed, as on the main line of a railroad, since, under such conditions the pressure will be heavy and the failure of any part of the switch will be a serious occurrence.

For the purpose of merely moving the rails in throwing the switch, the isolated lug may be depended upon.

It will be seen that my improvement dispenses with the use of screw threads and other objectionable features sometimes used in adjustment mechanism, as well as obviates the use of various small parts easily displaced and lost, while the operation of the device is simple and its various parts may be produced with economy.

While I have shown and described certain peculiar constructions herein, I do not wish to be understood as limiting myself thereto, but—

What I claim as new and desire to secure by Letters Patent is:

1. In an adjustable switch throwing crank, the combination with an arm having a slot with a pin passing through the slot, and a connecting rod pivotally attached to the crank, by means of the pin, to operatively connect the crank with the rails of the switch, of a plate rotatable on the pin and having abutments at various radial distances from the pin, and abutments on the crank adapted to engage with the abutments on the plate, substantially as and for the purposes specified.

2. In an adjustable switch throwing crank, the combination with an arm having a slot with a pin passing through the slot, and a connecting rod pivotally attached to the crank by means of the pin to operatively connect the crank with the rails of the switch, of a plate having an opening through which the pin passes and by which said plate is pivotally mounted, and having additional openings located at various radial distances from the opening through which the pin passes, and a lug on the crank adapted to engage within any one of the additional openings, substantially as and for the purposes specified.

3. In an adjustable switch throwing crank, the combination with an arm having a slot with a pin passing through the slot, and a connecting rod pivotally attached to the crank by means of the pin to operatively connect the crank with the rails of the switch, of a plate having an opening, through which the pin passes and by which said plate is pivotally mounted, and having additional openings located at various radial distances from the opening through which the pin passes, an isolated lug on the crank adapted to engage within any one of the additional openings, a hub on the crank by means of which it is operatively mounted, and a lug on the crank adjacent to the hub, adapted to engage with the periphery of the plate when the isolated lug engages within any one of the additional openings, to resist the movement of the plate toward the hub, substantially as and for the purposes specified.

4. In an adjustable switch throwing crank, the combination with an arm having a slot with a pin passing through the slot, and a connecting rod pivotally attached to the crank by means of the pin to operatively connect the crank with the rails of the switch, of a plate having an opening through which the pin passes and by which said plate is pivotally mounted, and having additional openings located at various radial distances from the opening through which the pin passes, an isolated lug on the crank adapted to engage within any one of the additional openings in the plate, a hub on the crank by which it is operatively mounted, and a lug extending from the hub, adapted to make contact with the periphery of the plate to resist its movement toward the hub, the periphery of the plate having extensions conforming to arcs concentric with the additional openings in the plate, and the lug which extends from the hub having a recess conforming to the extensions of the plate and being shaped to allow the plate to rotate slightly on the isolated lug, substantially as and for the purposes specified.

5. In an adjustable switch throwing crank, the combination with an arm having a slot with a pin passing through the slot, and a connecting rod pivotally attached to the crank by means of the pin to operatively connect the crank with the rails of the switch, of plates having openings through which the pin passes and by which said plates are pivotally mounted, and having additional openings located at various radial distances from the openings through which the pin passes, said plates being mounted, respectively, on the upper and lower sides of the crank, and isolated lugs on the upper and lower sides of the crank adapted to engage within the additional openings in the plates, substantially as and for the purposes specified.

FRANK C. ANDERSON.

Witnesses:
  JAMES N. RAMSEY,
  CLARENCE PERDEW.